United States Patent
Ahn et al.

(10) Patent No.: US 9,988,493 B2
(45) Date of Patent: *Jun. 5, 2018

(54) POLY(IMIDE-AMIDE) COPOLYMER, ARTICLE CONTAINING POLY(IMIDE-AMIDE) COPOLYMER, AND DISPLAY DEVICE INCLUDING SAME

(71) Applicants: SAMSUNG ELECTRONICS CO., LTD., Suwon-si, Gyeonggi-do (KR); SAMSUNG SDI CO., LTD., Yongin-si, Gyeonggi-do (KR)

(72) Inventors: Chanjae Ahn, Seoul (KR); Sungwon Choi, Hwaseong-si (KR); Sungwoo Hong, Seoul (KR); Byunghee Sohn, Yongin-si (KR); Sun Jin Song, Seoul (KR); Kyeong-sik Ju, Suwon-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/741,959

(22) Filed: Jun. 17, 2015

(65) Prior Publication Data

US 2016/0222166 A1    Aug. 4, 2016

(30) Foreign Application Priority Data

Feb. 4, 2015    (KR) .......................... 10-2015-0017482

(51) Int. Cl.
C08G 73/00    (2006.01)
C08G 73/14    (2006.01)
C08G 73/10    (2006.01)

(52) U.S. Cl.
CPC .......... *C08G 73/14* (2013.01); *C08G 73/1039* (2013.01)

(58) Field of Classification Search
None
See application file for complete search history.

(56) References Cited

U.S. PATENT DOCUMENTS

| | | | |
|---|---|---|---|
| 9,018,343 B2 | 4/2015 | Park et al. | |
| 9,051,425 B2 * | 6/2015 | Cho | C08G 73/1039 |
| 9,200,117 B2 * | 12/2015 | Cho | C08G 73/14 |
| 9,334,370 B2 * | 5/2016 | Cho | C08K 3/22 |
| 9,365,694 B2 * | 6/2016 | Cho | C08G 73/1067 |
| 2012/0296050 A1 * | 11/2012 | Cho | C08G 73/14 525/436 |
| 2014/0031499 A1 * | 1/2014 | Cho | C08G 73/1067 525/431 |

* cited by examiner

*Primary Examiner* — Ana L Woodward
(74) *Attorney, Agent, or Firm* — Cantor Colburn LLP

(57) ABSTRACT

A poly(amide-imide) copolymer including a structural unit represented by Chemical Formula 1; a structural unit represented by Chemical Formula 2, and/or an amic acid precursor structural unit which forms the structural unit represented by Chemical Formula 2 through imidization; and a structural unit represented by Chemical Formula 3, and/or an amic acid precursor structural unit which forms the structural unit represented by Chemical Formula 3 through imidization, wherein the poly(amide-imide) copolymer has a modulus of greater than or equal to about 5.5 giga Pascals after being cured, a yellowness index YI of less than or equal to about 3.5, and an increase in yellowness index $\Delta$YI of less than or equal to about 0.7 after being exposed to ultraviolet light for 72 hours:

Chemical Formula 1

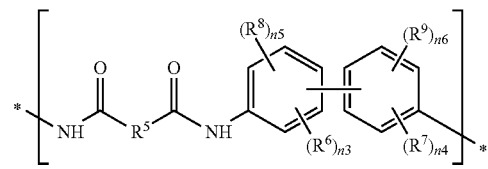

Chemical Formula 2

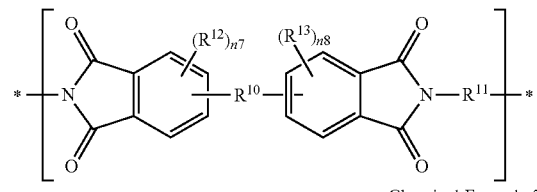

Chemical Formula 3

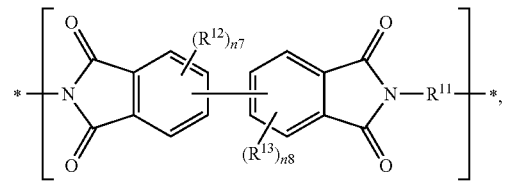

wherein in Chemical Formulae 1 to 3, groups and variables are the same as described in the specification.

10 Claims, No Drawings

POLY(IMIDE-AMIDE) COPOLYMER, ARTICLE CONTAINING POLY(IMIDE-AMIDE) COPOLYMER, AND DISPLAY DEVICE INCLUDING SAME

CROSS-REFERENCE TO RELATED APPLICATION

This application claims priority to Korean Patent Application No. 10-2015-0017482, filed on Feb. 4, 2015, and all the benefits accruing therefrom under 35 U.S.C. § 119, the content of which in its entirety is herein incorporated by reference.

BACKGROUND

Field

This disclosure relates to a poly(imide-amide) copolymer, an article containing poly(imide-amide) copolymer, and a display device including the article.

Description of the Related Art

A need for a flexible, light, and portable display that requires low electric power is growing as a demand for a display device that delivers and visualizes various pieces of information increases.

In order to fabricate a flexible display, numerous constituting parts such as flexible substrate, organic and inorganic materials for processing at a low temperature, flexible electronics, encapsulating, packaging technology, and the like are required.

To be applicable in a flexible display, it is desired that a transparent plastic film replacing conventional window cover glass have high hardness and good optical properties.

Although hardness of the transmittance plastic film may be supplemented by coating a hard-coating layer on the surface of the film, achieving high tension modulus of the base film may be helpful to increase hardness of the final film.

Desired optical properties may include high transmittance for light, low haze and low yellowness index (YI), anti-UV color change properties, and the like. Anti-UV color change properties mean that YI does not increase upon UV-radiation in a predetermined period of time.

Thus, there remains a need for a polymer film having high modulus, low YI, and anti-UV color change properties.

SUMMARY

An embodiment provides a poly(amide-imide) copolymer having high modulus, low YI, and anti-UV color change properties.

Another embodiment provides an article including a poly(amide-imide) copolymer having high modulus, low YI, and anti-UV color change properties.

Yet another embodiment provides a display device including an article including a poly(amide-imide) copolymer having high modulus, low YI, and anti-UV color change properties.

According to an embodiment, provided is a poly(amide-imide) copolymer including
a structural unit represented by Chemical Formula 1;
a structural unit represented by Chemical Formula 2, and/or an amic acid precursor structural unit which forms the structural unit represented by Chemical Formula 2 through imidization; and
a structural unit represented by Chemical Formula 3, and/or an amic acid precursor structural unit which forms the structural unit represented by Chemical Formula 3 through imidization:

Chemical Formula 1

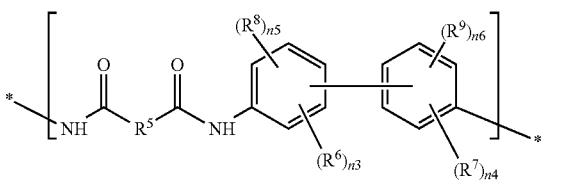

wherein in Chemical Formula 1,
$R^5$ is the same or different in each structural unit, and is each independently a substituted or unsubstituted C6 to C30 aromatic organic group, wherein the C6 to C30 aromatic organic group includes two or more aromatic rings, wherein the two or more aromatic rings are fused together to provide a condensed ring system, or wherein the two or more aromatic rings are connected through a single bond or through a functional group selected from a fluorenylene group, O, S, C(=O), CH(OH), S(=O)$_2$, and a combination thereof,
$R^6$ and $R^7$ are the same or different and are each independently an electron withdrawing group selected from —CF$_3$, —CCl$_3$, —CBr$_3$, —Cl$_3$, —F, —Cl, —Br, —I, —NO$_2$, —CN, —COCH$_3$, and —CO$_2$C$_2$H$_5$;
$R^8$ and $R^9$ are the same or different, and are each independently a halogen, a hydroxy group, a substituted or unsubstituted C1 to C10 aliphatic organic group, a C6 to C20 aromatic organic group, an alkoxy group of formula —OR$^{204}$ (wherein R$^{204}$ is a C1 to C10 aliphatic organic group), or a silyl group of formula —SiR$^{205}$R$^{206}$R$^{207}$ (wherein R$^{205}$, R$^{206}$, and R$^{207}$ are the same or different and are each independently hydrogen or a C1 to C10 aliphatic organic group);
n3 is an integer ranging from 1 to 4, n5 is an integer ranging from 0 to 3, provided that n3+n5 is an integer ranging from 1 to 4,
n4 is an integer ranging from 1 to 4, n6 is an integer ranging from 0 to 3, provided that n4+n6 is an integer ranging from 1 to 4.

Chemical Formula 2

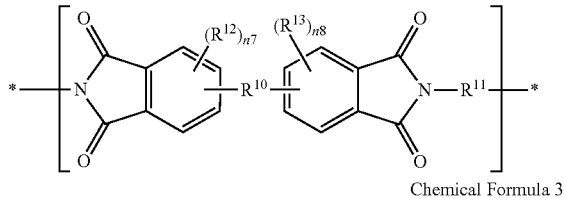

Chemical Formula 3 wherein in Chemical Formula 2 or 3,
$R^{10}$ is the same or different in each structural unit, and is each independently a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{11}$ is the same or different in each structural unit, and each independently includes a substituted or unsubstituted C6 to C30 aromatic organic group, wherein the C6 to C30 aromatic organic group is a single aromatic ring, two or more aromatic rings fused together to provide a condensed ring system, or two or more moieties independently selected from the single aromatic ring and two or more aromatic rings fused together to provide a condensed ring system, which are connected through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, and a combination thereof;

$R^{12}$ and $R^{13}$ are the same or different, and are each independently a halogen, a hydroxy group, a substituted or unsubstituted C1 to C10 aliphatic organic group, a C6 to C20 aromatic organic group, an alkoxy group of formula —OR$^{208}$, wherein $R^{208}$ is a C1 to C10 aliphatic organic group, or a silyl group of formula —SiR$^{203}$R$^{210}$R$^{211}$, wherein $R^{209}$, $R^{210}$, and $R^{211}$ are the same or different, and are each independently hydrogen or a C1 to C10 aliphatic organic group, and n7 and n8 are each independently integers ranging from 0 to 3, wherein the poly(amide-imide) copolymer has a modulus of greater than or equal to about 5.5 giga Pascals after being cured, a yellowness index YI of less than or equal to about 3.5, and an increase in yellowness index ΔYI of less than or equal to about 0.7 after being exposed to ultraviolet light for 72 hours.

In Chemical Formulae 1, $R^5$ may be the same or different and may be each independently selected from chemical formulae.

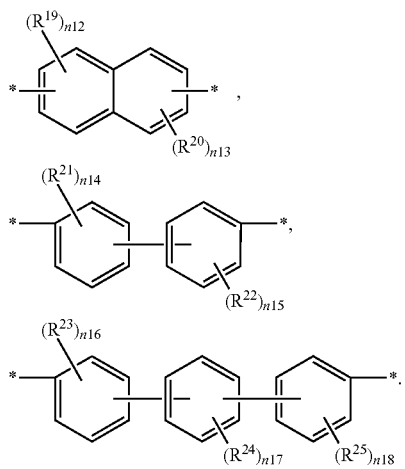

In the chemical formulae, $R^{19}$ to $R^{25}$ are the same or different, and are each independently deuterium, a halogen, a substituted or unsubstituted C1 to C10 aliphatic organic group, or a substituted or unsubstituted C6 to C20 aromatic organic group, n12 and n13 are independently integers ranging from 0 to 3, and n14 and n18 are independently integers ranging from 0 to 4.

Particularly, $R^5$ may be the same or different and may be each independently selected from chemical formulae.

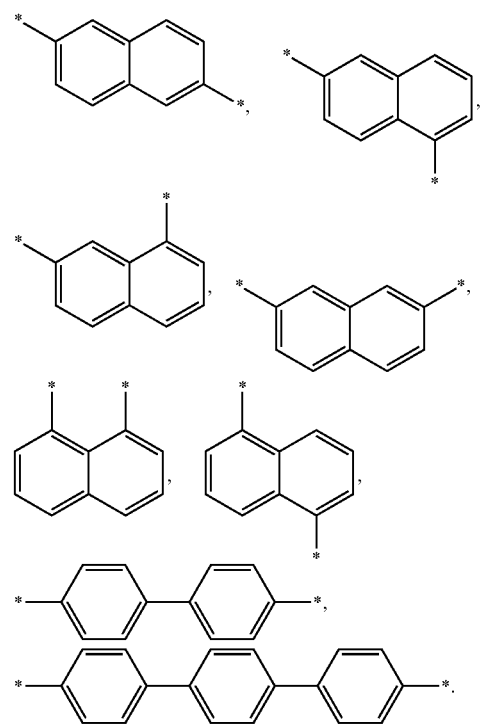

Particularly, Chemical Formula 2 may be represented by Chemical Formula 4:

Chemical Formula 4 wherein in Chemical Formula 4, $R^{11}$, $R^{12}$, $R^{13}$, n7, and n8 are the same as in Chemical Formula 2.

In the above copolymer, an amount of the structural unit represented by Chemical Formula 1 may be from about 5 mole percent to about 50 mole percent based on the total mole number of the structural units in the copolymer.

Particularly, in the above copolymer, an amount of the structural unit represented by Chemical Formula 1 may be from about 10 mole percent to about 40 mole percent based on the total mole number of the structural units in the copolymer.

In the above copolymer, an amount of the structural unit represented by Chemical Formula 3 and/or the amic acid structural unit which forms the structural unit represented by Chemical Formula 3 through imidization may be from about 30 mole percent to about 70 mole percent based on the total mole number of the structural units in the copolymer.

In the above copolymer, the total amount of the structural unit represented by Chemical Formula 1, and the structural unit represented by Chemical Formula 3 and/or the amic acid structural unit which forms the structural unit represented by Chemical Formula 3 through imidization may be greater than about 60 mole percent and less than about 90 mole percent based on the total mole number of the structural units in the copolymer.

The above copolymer may include about 5 mole percent to about 50 mole percent of the structural unit represented by Chemical Formula 1, about 20 mole percent to about 80 mole percent of the structural unit represented by Chemical Formula 3 and/or the amic acid structural unit which forms the structural unit represented by Chemical Formula 3 through imidization, and the remaining amount of the structural unit represented by Chemical Formula 2 and/or the amic acid structural unit which forms the structural unit represented by Chemical Formula 2 through imidization, wherein the total amount of the structural unit represented by Chemical Formula 1, and the structural unit represented by Chemical Formula 3 and/or the amic acid structural unit which forms the structural unit represented by Chemical Formula 3 through imidization may be greater than about 60 mole percent and less than about 90 mole percent based on the total mole number of the structural units in the copolymer.

The structural unit represented by Chemical Formula 1 may be represented by Chemical Formula 7, the structural unit represented by Chemical Formula 2 may be represented by Chemical Formula 8, the structural unit represented by Chemical Formula 3 may be represented by Chemical Formula 9:

The above copolymer may further include a structural unit represented by the Chemical Formula 5, a structural unit represented by the Chemical Formula 6, or a combination thereof:

Chemical Formula 5

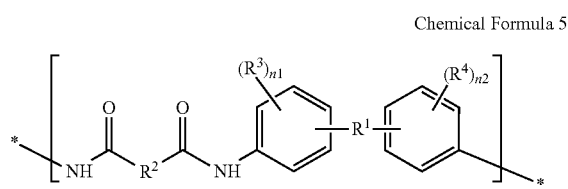

wherein in Chemical Formula 5, $R^1$ is the same or different in each structural unit, and is each independently a substituted or unsubstituted C3 to C30 alicyclic organic group, a substituted or unsubstituted C6 to C30 aromatic organic group, or a substituted or unsubstituted C2 to C30 heterocyclic group, $R^2$ is the same or different in each structural unit, and is each independently a substituted or unsubstituted C6 to C30 aromatic organic group, $R^3$ and $R^4$ are the same or different, and are each independently a halogen, a hydroxy group, a substituted or unsubstituted C1 to C10 aliphatic organic group, a C6 to C20 aromatic organic group, an alkoxy group of formula —$OR^{200}$, wherein $R^{200}$ is a C1 to C10 aliphatic organic group, or a silyl group of formula —$SiR^{201}R^{202}R^{203}$, wherein $R^{201}$, $R^{202}$, and $R^{203}$ are the same or different, and are each independently hydrogen or a C1 to C10 aliphatic organic group, and Chemical Formula 7

[structure]

Chemical Formula 8

[structure]

Chemical Formula 9

[structure]

The above copolymer may include about 5 mole percent to about 50 mole percent of the structural unit represented by Chemical Formula 7, about 20 mole percent to about 80 mole percent of the structural unit represented by Chemical Formula 9 and/or the amic acid structural unit which forms the structural unit represented by Chemical Formula 9 through imidization, and the remaining amount of the structural unit represented by Chemical Formula 8 and/or the amic acid structural unit which forms the structural unit represented by Chemical Formula 8 through imidization, wherein the total amount of the structural unit represented by Chemical Formula 7, and the structural unit represented by Chemical Formula 9 and/or the amic acid structural unit which forms the structural unit represented by Chemical Formula 9 through imidization may be greater than about 60 mole percent and less than about 90 mole percent based on the total mole number of the structural units in the copolymer.

n1 and n2 are independently integers ranging from 0 to 4;

Chemical Formula 6

[structure]

wherein in Chemical Formula 6, $R^{14}$ is the same or different in each structural unit, and each independently includes O, S, C(=O), CH(OH), S(=O)$_2$, Si(CH$_3$)$_2$, (CH$_2$)$_p$ wherein $1 \leq p \leq 10$, (CF$_2$)$_q$ wherein $1 \leq q \leq 10$, C(CH$_3$)$_2$, C(CF$_3$)$_2$, C(=O)NH, or a substituted or unsubstituted C6 to C30 aromatic organic group, wherein the aromatic organic group is a single aromatic ring, two or more aromatic rings fused together to provide a condensed ring system, or two or more moieties independently selected from the single aromatic ring and two or more aromatic rings fused together to provide a condensed ring system, which are connected through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, $R^{15}$ is the same or different in each structural unit and is each independently a substituted or unsubstituted C6 to C30 aromatic organic group, $R^{16}$ and $R^{17}$ are the same or different, and are each independently a halogen, a hydroxy group, a substituted or unsubstituted C1 to C10 aliphatic organic group, a C6 to C20 aromatic organic group, an alkoxy group of formula —OR$^{208}$, wherein R$^{208}$ is a C1 to C10 aliphatic organic group, or a silyl group of formula —SiR$^{209}$R$^{210}$R$^{211}$, wherein R$^{209}$, R$^{210}$, and R$^{211}$ are the same or different, and are each independently hydrogen or a C1 to C10 aliphatic organic group, and n9 and n10 are each independently integers ranging from 0 to 4.

In Chemical Formula 5, $R^1$ is the same or different in each structural unit and is each independently selected from chemical formulae:

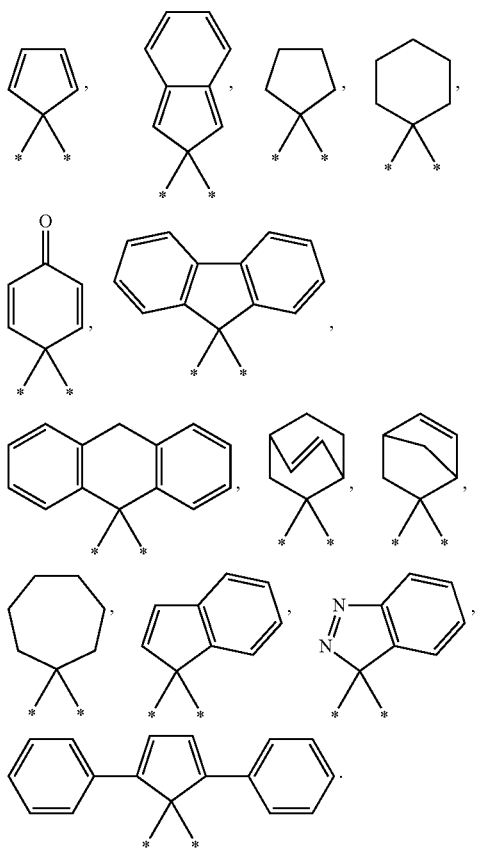

In Chemical Formulae 5 and 6, $R^2$ and $R^5$ are the same or different in each structural unit and are each independently selected from chemical formulae:

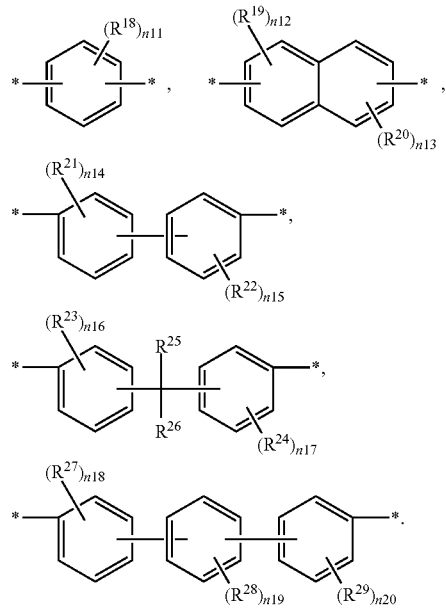

wherein in the chemical formulae, $R^{18}$ to $R^{29}$ are the same or different, and are each independently deuterium, a halogen, a substituted or unsubstituted C1 to C10 aliphatic organic group, or a substituted or unsubstituted C6 to C20 aromatic organic group, n11 and n14 to n20 are independently integers ranging from 0 to 4, and n12 and n13 are independently integers ranging from 0 to 3.

According to another embodiment, an article including the poly(imide-amide) copolymer.

The article may be a film, a fiber, a coating material, or an adhesive.

The article may be a film having a tension modulus of greater than or equal to about 5.5 giga Pascals, and a yellowness index YI of less than or equal to about 3.5.

The article may have an increase in yellowness index ΔYI of less than or equal to about 0.7 after being exposed to ultraviolet light for 72 hours.

The article may have an increase in yellowness index ΔYI of less than or equal to about 0.5 after being exposed to ultraviolet light for 72 hours.

According to yet another embodiment, provided is a display device including the article.

Hereinafter, further embodiments will be described in detail.

DETAILED DESCRIPTION

This disclosure will be described more fully hereinafter with reference to the following embodiments. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present. It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"Mixture", as used herein, is inclusive of all types of combinations, including blends, alloys, solutions, and the like.

As used herein, when a specific definition is not otherwise provided, the term "substituted" refers to a group or compound substituted with at least one substituent including a halogen (F, Br, Cl, or I), a hydroxyl group, a nitro group, a cyano group, an amino group ($NH_2$, $NH(R^{100})$ or $N(R^{101})(R^{102})$, wherein $R^{100}$, $R^{101}$, and $R^{102}$ are the same or different, and are each independently a C1 to C10 alkyl group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, when a specific definition is not otherwise provided, the term "alkyl group" refers to a C1 to C30 alkyl group, and specifically a C1 to C15 alkyl group, the term "cycloalkyl group" refers to a C3 to C30 cycloalkyl group, and specifically a C3 to C18 cycloalkyl group, the term "alkoxy group" refer to a C1 to C30 alkoxy group, and specifically a C1 to C18 alkoxy group, the term "ester group" refers to a C2 to C30 ester group, and specifically a C2 to C18 ester group, the term "ketone group" refers to a C2 to C30 ketone group, and specifically a C2 to C18 ketone group, the term "aryl group" refers to a C6 to C30 aryl group, and specifically a C6 to C18 aryl group, the term "alkenyl group" refers to a C2 to C30 alkenyl group, and specifically a C2 to C18 alkenyl group, the term "alkynyl group" refers to a C2 to C30 alkynyl group, and specifically a C2 to C18 alkynyl group, the term "alkylene group" refers to a C1 to C30 alkylene group, and specifically a C1 to C18 alkylene group, and the term "arylene group" refers to a C6 to C30 arylene group, and specifically a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein, when a definition is not otherwise provided, the term "aromatic organic group" refers to a C6 to C30 group comprising one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, O, S, C(=O), CH(OH), S(=O)$_2$, Si(CH$_3$)$_2$, (CH$_2$)$_p$ wherein $1 \leq p \leq 10$, (CF$_2$)$_q$ wherein $1 \leq q \leq 10$, C(CH$_3$)$_2$, C(CF$_3$)$_2$, and C(=O)NH, and specifically through S(=O)$_2$, for example an aryl group or a C6 to C30 arylene group, specifically a C6 to C16 aryl group or a C6 to C16 arylene group such as phenylene.

As used herein, when a specific definition is not otherwise provided, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, specifically a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

As used herein, when a definition is not otherwise provided, "combination" commonly refers to mixing or copolymerization.

In addition, in the specification, the mark "*" may refer to where a point of attachment to another atom.

According to an embodiment, provided is a poly(amide-imide) copolymer including a structural unit represented by Chemical Formula 1;

a structural unit represented by Chemical Formula 2, and/or an amic acid precursor structural unit which forms the structural unit represented by Chemical Formula 2 through imidization; and a structural unit represented by Chemical Formula 3, and/or an amic acid precursor structural unit which forms the structural unit represented by Chemical Formula 3 through imidization:

Chemical Formula 1

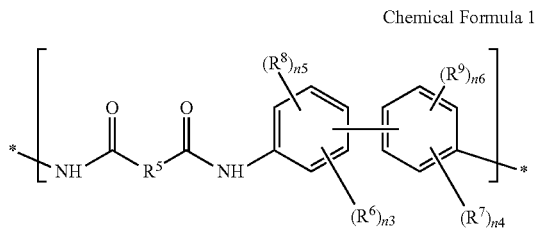

In Chemical Formula 1, $R^5$ is the same or different in each structural unit, and is each independently a substituted or unsubstituted C6 to C30 aromatic organic group, wherein the C6 to C30 aromatic organic group includes two or more aromatic rings, wherein the two or more aromatic rings are fused together to provide a condensed ring system, or wherein the two or more aromatic rings are connected through a single bond or through a functional group selected from a fluorenylene group, O, S, C(=O), CH(OH), S(=O)$_2$, and a combination thereof, $R^6$ and $R^7$ are the same or different and are each independently an electron withdrawing group selected from —CF$_3$, —CCl$_3$, —CBr$_3$, —Cl$_3$, —F, —Cl, —Br, —I, —NO$_2$, —CN, —COCH$_3$, and —CO$_2$C$_2$H$_5$;

$R^8$ and $R^9$ are the same or different, and are each independently a halogen, a hydroxy group, a substituted or unsubstituted C1 to C10 aliphatic organic group, a C6 to C20 aromatic organic group, an alkoxy group of formula —OR$^{204}$ (wherein R$^{204}$ is a C1 to C10 aliphatic organic group), or a silyl group of formula —SiR$^{205}$R$^{206}$R$^{207}$ (wherein R$^{205}$, R$^{206}$, and R$^{207}$ are the same or different and are each independently hydrogen or a C1 to C10 aliphatic organic group);

n3 is an integer ranging from 1 to 4, n5 is an integer ranging from 0 to 3, provided that n3+n5 is an integer ranging from 1 to 4, n4 is an integer ranging from 1 to 4, n6 is an integer ranging from 0 to 3, provided that n4+n6 is an integer ranging from 1 to 4.

Chemical Formula 2

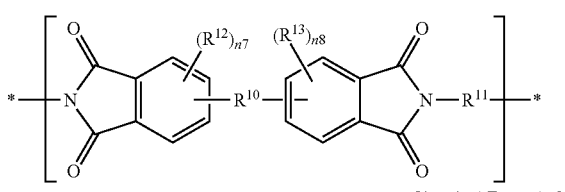

Chemical Formula 3

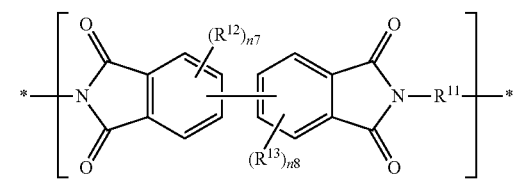

In Chemical Formula 2 or 3, $R^{10}$ is the same or different in each structural unit, and is each independently a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{11}$ is the same or different in each structural unit, and each independently includes a substituted or unsubstituted C6 to C30 aromatic organic group, wherein the C6 to C30 aromatic organic group is a single aromatic ring, two or more aromatic rings fused together to provide a condensed ring system, or two or more moieties independently selected from the single aromatic ring and two or more aromatic rings fused together to provide a condensed ring system, which are connected through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, and a combination thereof;

$R^{12}$ and $R^{13}$ are the same or different, and are each independently a halogen, a hydroxy group, a substituted or unsubstituted C1 to C10 aliphatic organic group, a C6 to C20 aromatic organic group, an alkoxy group of formula —OR$^{208}$, wherein R$^{208}$ is a C1 to C10 aliphatic organic group, or a silyl group of formula —SiR$^{209}$R$^{210}$R$^{211}$, wherein R$^{209}$, R$^{210}$, and R$^{211}$ are the same or different, and are each independently hydrogen or a C1 to C10 aliphatic organic group, and n7 and n8 are each independently integers ranging from 0 to 3.

As described above, the poly(imide-amide) copolymer according to an embodiment may have a modulus of greater than or equal to about 5.5 giga Pascals after being cured, a yellowness index YI of less than or equal to about 3.5, and an increase in yellowness index ΔYI of less than or equal to about 0.7 after being exposed to (radiated by) ultraviolet light (UV) for 72 hours.

Studies for providing light in weight, flexible, and bendable mobile devices, such as smart phones and tablet PCs, are undergoing. In this regard, transparent and flexible window films having high hardness are desired for replacing hard glass disposed on the screen of the mobile devices.

In order to be used as a window film, transparent films should have high hardness and good optical properties. Although hardness may be supplemented by coating a hard coating layer on the film, high tension modulus of the film may be helpful to achieve increased hardness of the final film. Additional optical properties may include high transmittance for light, low haze, low yellowness index (YI), and the like.

Poly(imide-amide) copolymer has good mechanical, thermal, optical properties, and the like, and thus is used as a substrate for display device, such as an organic light emitting diode ("OLED"), liquid crystal display ("LCD"), and the like. In order to use such poly(imide-amide) copolymer as a window film for flexible display device, mechanical and optical properties, such as, hardness (or modulus), and the like, should be further improved, and low YI should be achieved. However, modulus and YI are in so-called "trade-off" relation, and thus it is very difficult to improve the two properties at the same time.

The inventors have introduced an amide group having a rigid structure to produce a poly(imide-amide) copolymer having increased modulus without deteriorating YI of a film. Particularly, in the poly(imide-amide) copolymer according to an embodiment, $R^5$ in Chemical Formula 1 is a substituted or unsubstituted C6 to C30 aromatic organic group, wherein the aromatic organic group has two or more aromatic rings, where the two or more aromatic rings may be fused together to provide a condensed ring system, or the two or more aromatic rings are connected (linked) through a single bond or through a functional group selected from a fluorenylene group, O, S, C(=O), CH(OH), S(=O)$_2$, and a combination thereof. Without being bound by a specific theory, it is believed that the amide structural unit including the two or more aromatic organic rings included in the poly(imide-amide) copolymer according to an embodiment in a predetermined amount, allows to obtain the copolymer having high hardness without deterioration of its yellowness index (YI).

Further, the imide structural unit represented by Chemical Formula 3 has two phenylene groups connected (linked) through a single bond, which induces structural rigidity of the poly(imide-amide) copolymer and increases hardness of the films prepared from the copolymer.

In addition, both the structural unit of Chemical Formula 1 and the structural unit of Chemical Formula 3 are bring structural rigidity to the copolymer, and thus, if the structural units are included in greater than a predetermined amount, YI may increase due to the increase in rigidity of the entire copolymer structure. Accordingly, the inventors have found that when the total amount of the structural unit of Chemical Formula 1 and the structural unit of Chemical Formula 3 does not exceed a predetermined content based on the total mole number of structural units included in the copolymer, it is possible to prepare a copolymer having high modulus without deterioration of its yellowness index (YI).

From this point of view, the structural unit represented by Chemical Formula 1 may be included in an amount of from about 5 mole percent (mol %) to about 50 mol %, for example, from about 10 mol % to about 40 mol %, based on the total mole number of the structural units included in the copolymer.

In the above copolymer, the structural unit represented by Chemical Formula 3 and/or the amic acid structural unit which forms the structural unit represented by Chemical Formula 3 through imidization may be included in an amount of from about 20 mol % to about 80 mol %, for example, from about 30 mol % to about 70 mol %, based on the total mole number of the structural units included in the copolymer.

In the above copolymer, the total amount of the structural unit represented by Chemical Formula 1, and the structural unit represented by Chemical Formula 3 and/or the amic acid structural unit which forms the structural unit represented by Chemical Formula 3 through imidization may be greater than about 60 mol % and less than about 90 mol % based on the total mole number of the structural units included in the copolymer.

When the total amount of the structural unit represented by Chemical Formula 1, and the structural unit represented by Chemical Formula 3 and/or the amic acid structural unit which forms the structural unit represented by Chemical Formula 3 through imidization are within the above range, the copolymer prepared from the structural units may have tension modulus of greater than or equal to about 5.5 giga Pascals (GPa) after being cured, yellowness index (YI) of less than or equal to about 3.5, and increase in yellowness index (ΔYI) of less than or equal to about 0.7 after being exposed to (radiated by) ultraviolet light (UV) for 72 hours.

When the total amount of the structural unit represented by Chemical Formula 1, and the structural unit represented by Chemical Formula 3 and/or the amic acid structural unit which forms the structural unit represented by Chemical Formula 3 through imidization are not within the above range, for example, when the total amount thereof is less than 60 mol %, the tension modulus of the copolymer prepared therefrom may be less than 5.5 GPa, which is not sufficiently high for the copolymer material to have excellent hardness. Further, for example, when the total amount thereof is greater than 90 mol %, rigidity of structure of the copolymer may become very high, which may causes increase in YI of greater than 3%.

The poly(imide-amide) copolymer having tension modulus of greater than or equal to about 5.5 GPa and yellowness index (YI) of less than or equal to about 3.5 may have sufficiently high hardness and transparency to be used as a window film in a flexible display device.

Further, the copolymer may have an increase in yellowness index (ΔYI) of less than or equal to about 0.7 after being exposed to (radiated by) UV for 72 hours after being cured. That is, even upon 72 hours of radiation with UV light, yellowness of the copolymer may hardly occur.

In an exemplary embodiment, $R^5$ may be the same or different and may be each independently selected from the following chemical formulae.

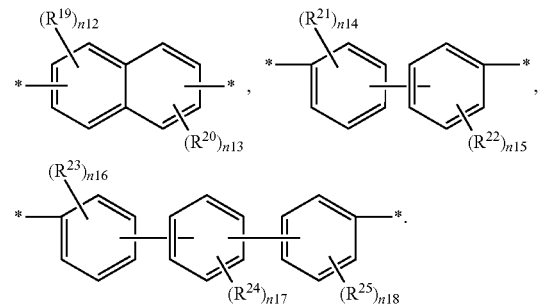

In the above chemical formulae,
$R^{19}$ to $R^{25}$ are the same or different, and are each independently deuterium, a halogen, a substituted or unsubstituted C1 to C10 aliphatic organic group, or a substituted or unsubstituted C6 to C20 aromatic organic group,
n12 and n13 are independently integers ranging from 0 to 3, and
n14 and n18 are independently integers ranging from 0 to 4.

In an exemplary embodiment, $R^5$ may be the same or different and may be each independently selected from the following chemical formulae.

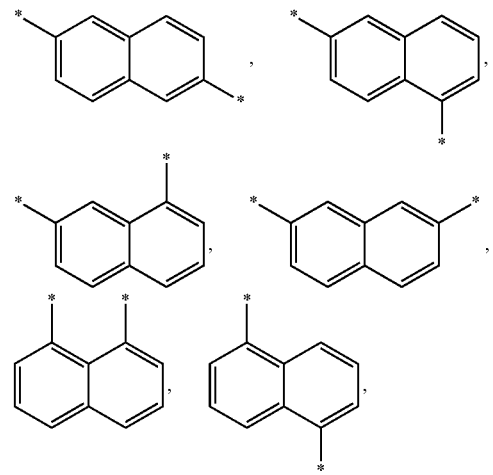

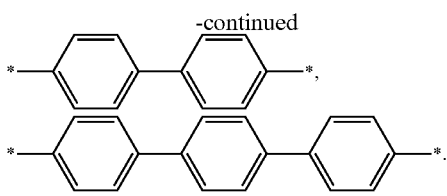

In an exemplary embodiment, Chemical Formula 2 may be represented by Chemical Formula 4:

Chemical Formula 4

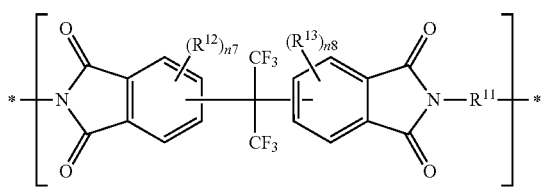

In Chemical Formula 4, $R^{11}$, $R^{12}$, $R^{13}$, n7, and n8 are the same as described in the above Chemical Formula 2.

In an exemplary embodiment, the structural unit represented by Chemical Formula 1 may be represented by Chemical Formula 7, the structural unit represented by Chemical Formula 2 may be represented by Chemical Formula 8, the structural unit represented by Chemical Formula 3 may be represented by Chemical Formula 9:

Chemical Formula 7

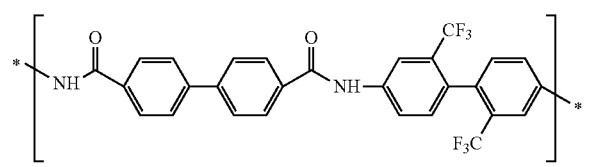

Chemical Formula 8

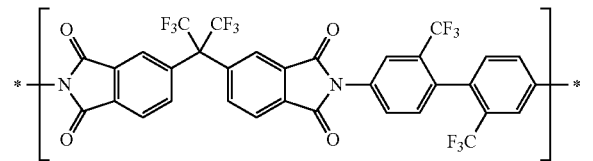

Chemical Formula 9

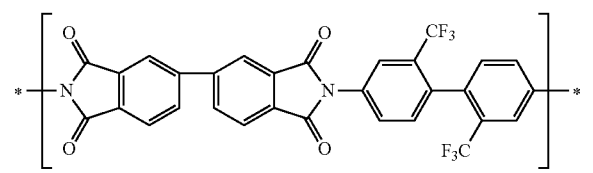

In an exemplary embodiment, the above copolymer may include about 5 mol % to about 50 mol % of the structural unit represented by Chemical Formula 7, about 20 mol % to about 80 mol % of the structural unit represented by Chemical Formula 9 and/or the amic acid structural unit which forms the structural unit represented by Chemical Formula 9 through imidization, and the remaining amount (balance) of the structural unit represented by Chemical Formula 8 and/or the amic acid structural unit which forms the structural unit represented by Chemical Formula 8 through imidization, wherein the total amount of the structural unit represented by Chemical Formula 7, and the structural unit represented by Chemical Formula 9 and/or the amic acid structural unit which forms the structural unit represented by Chemical Formula 9 through imidization may be greater than about 60 mol % and less than about 90 mol % based on the total mole number of the structural units included in the copolymer.

The copolymer may include each of about 1 to about 1,000 of the structural unit represented by Chemical Formula 1, the structural unit represented by Chemical Formula 2, or the amic acid structural unit which forms the structural unit represented by Chemical Formula 2 through imidization, and the structural unit represented by Chemical Formula 3, or an amic acid structural unit which forms the structural unit represented by Chemical Formula 3 through imidization.

The copolymer may further include a structural unit represented by the Chemical Formula 5, a structural unit represented by the Chemical Formula 6, or a combination thereof:

Chemical Formula 5

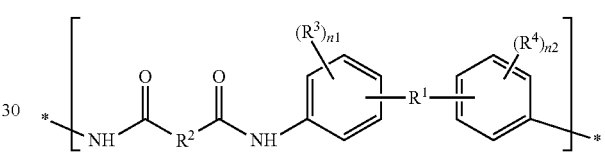

In Chemical Formula 5, $R^1$ is the same or different in each structural unit, and is each independently a substituted or unsubstituted C3 to C30 alicyclic organic group, a substituted or unsubstituted C6 to C30 aromatic organic group, or a substituted or unsubstituted C2 to C30 heterocyclic group, $R^2$ is the same or different in each structural unit, and is each independently a substituted or unsubstituted C6 to C30 aromatic organic group, $R^3$ and $R^4$ are the same or different, and are each independently a halogen, a hydroxy group, a substituted or unsubstituted C1 to C10 aliphatic organic group, a C6 to C20 aromatic organic group, an alkoxy group of formula —$OR^{200}$, wherein $R^{200}$ is a C1 to C10 aliphatic organic group, or a silyl group of formula —$SiR^{201}R^{202}R^{203}$, wherein $R^{201}$, $R^{202}$, and $R^{203}$ are the same or different, and are each independently hydrogen or a C1 to C10 aliphatic organic group, and n1 and n2 are independently integers ranging from 0 to 4.

Chemical Formula 6

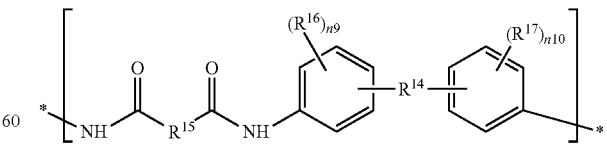

In Chemical Formula 6, $R^{14}$ is the same or different in each structural unit, and each independently includes O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, or a substituted or unsubstituted C6 to C30 aromatic organic group, wherein the aromatic organic group is a single aromatic ring, two or more aromatic rings fused together to provide a condensed ring system, or two or more aromatic rings independently selected from the single aromatic ring and two or more aromatic rings fused together to provide a condensed ring system, which are connected (linked) through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, $R^{15}$ is the same or different in each structural unit and is each independently a substituted or unsubstituted C6 to C30 aromatic organic group, $R^{16}$ and $R^{17}$ are the same or different, and are each independently a halogen, a hydroxy group, a substituted or unsubstituted C1 to C10 aliphatic organic group, a C6 to C20 aromatic organic group, an alkoxy group of formula —OR$^{208}$, wherein R$^{208}$ is a C1 to C10 aliphatic organic group, or a silyl group of formula —SiR$^{209}$R$^{210}$R$^{211}$, wherein R$^{209}$, R$^{210}$, and R$^{211}$ are the same or different, and are each independently hydrogen or a C1 to C10 aliphatic organic group, and n9 and n10 are each independently integers ranging from 0 to 4.

In Chemical Formula 5, $R^1$ is the same or different in each structural unit and is each independently selected from the following chemical formulae:

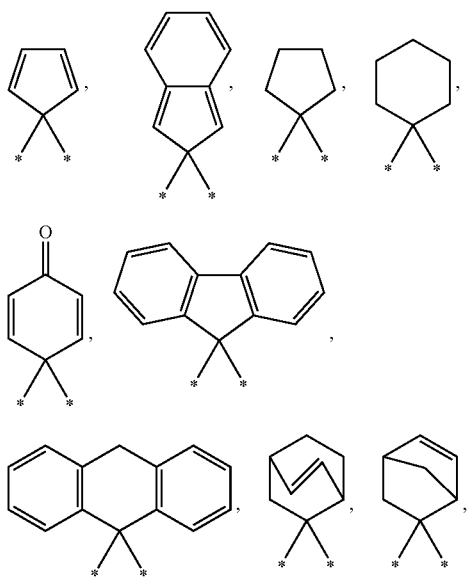

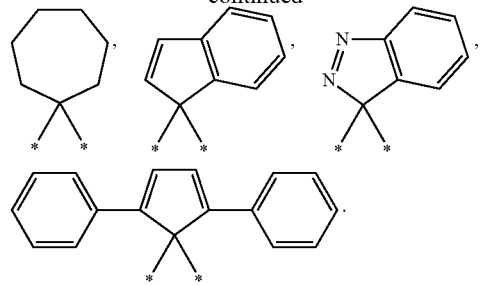

In Chemical Formulae 5 and 6, $R^2$ and $R^{15}$ are the same or different in each structural unit and are each independently selected from the following chemical formulae:

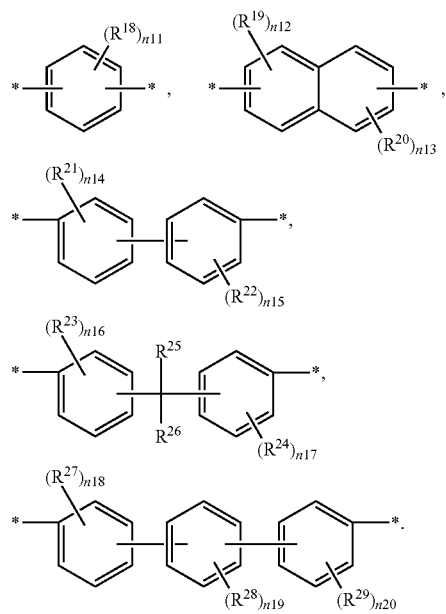

In the above chemical formulae, $R^{18}$ to $R^{29}$ are the same or different, and are each independently deuterium, a halogen, a substituted or unsubstituted C1 to C10 aliphatic organic group, or a substituted or unsubstituted C6 to C20 aromatic organic group, n11 and n14 to n20 are independently integers ranging from 0 to 4, and n12 and n13 are independently integers ranging from 0 to 3.

In an exemplary embodiment, the structural unit represented by Chemical Formula 5 may be any one represented by Chemical Formulae 10 to 12, and the structural unit represented by Chemical Formula 6 may be any one represented by Chemical Formulae 13 to 15:

Chemical Formula 10

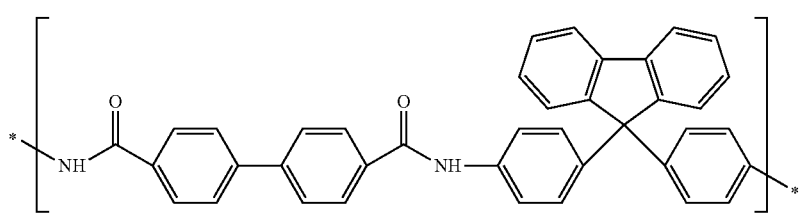

Chemical Formula 11

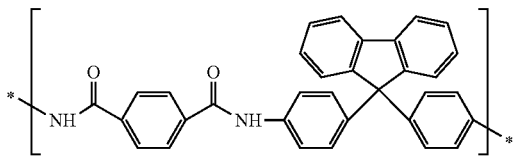

Chemical Formula 12

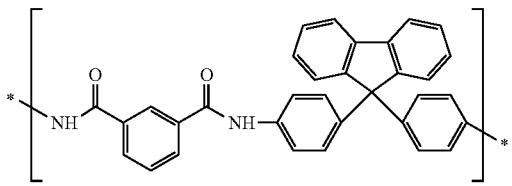

Chemical Formula 13

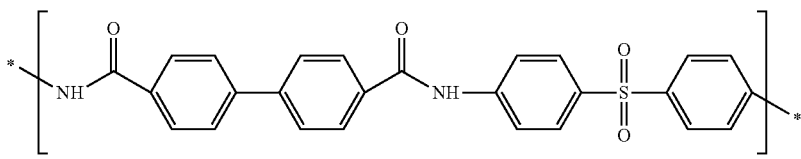

Chemical Formula 14

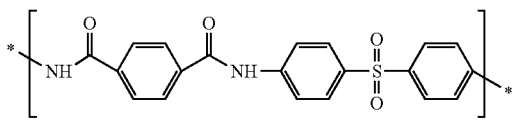

Chemical Formula 15

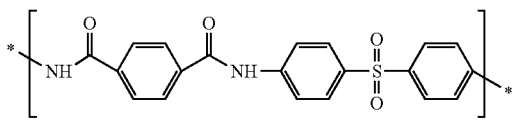

The copolymer according to an embodiment may not have to be prepared according to a specific method, and may be prepared using various methods known by a person having ordinary skills in the related arts.

The structural unit represented by Chemical Formula 1 is an amide structural unit, and it may be prepared through a method such as a low-temperature solution polymerization method, an interface polymerization method, a melt polymerization method, and a solid-phase polymerization method, but is not limited thereto.

Among these methods, a low-temperature solution polymerization method is given as an example, and a method for preparing the amide structural unit is described herein. According to the low-temperature solution polymerization method, an amide is prepared by polymerizing carboxylic acid dichloride and diamine in an aprotic bipolar solvent.

The aprotic bipolar solvent may include, for example, a sulfoxide solvent such as dimethyl sulfoxide and diethyl sulfoxide, a formamide solvent such as N,N-dimethyl formamide and N,N-diethyl formamide, an acetamide solvent such as N,N-dimethyl acetamide and N,N-diethyl acetamide, a pyrrolidone solvent such as N-methyl-2-pyrrolidone and N-vinyl-2-pyrrolidone, a phenol solvent such as phenol, o-, m-, or p-cresol, xylenol, halogenated phenol, and catechol, hexamethyl phosphoramide, γ-butyrolactone, or a mixture thereof. However, this disclosure is not limited to these solvents, and other suitable solvents, for example, an aromatic hydrocarbon solvent such as xylene and toluene may be used. Also, to promote the dissolution of a polymer, an alkali metal salt or an alkaline earth metal salt may be further added to the solvent in an amount of about 50 percent by weight (wt %) or less based on the total amount of the solvent.

The structural unit represented by Chemical Formula 1 may be obtained in the aprotic bipolar solvent by mixing and reacting a diamine, for example, a diamine selected from 4,4'-(9-fluorenylidene)dianiline (BAPF), 2,2'-bis(trifluoromethyl)benzidine (TFDB), 4,4'-diaminodiphenyl sulfone (DADPS), bis(4-(4-aminophenoxy)phenyl)sulfone (BAPS), 2,2',5,5'-tetrachlorobenzidine, 2,7-diaminofluorene, 1,1-bis(4-aminophenyl)cyclohexane, 4,4'-methylene-bis(2-methylcyclohexylamine), 4,4-diaminooctafluorobiphenyl, 3,3'-dihydroxybenzidine, 1,3-cyclohexanediamine, and a combination thereof; and carboxylic acid dichloride, for example, a carboxylic acid dichloride selected from terephthaloyl chloride (TPCl), isophthaloyl chloride (IPCl), biphenyl dicarbonyl chloride (BPCl), naphthalene dicarbonyl chloride, terphenyl dicarbonyl chloride, 2-fluoro-terephthaloyl chloride, and a combination thereof. Herein, the type and amount of the diamine and the carboxylic acid dichloride may be appropriately selected according to a desired composition of the structural unit represented by Chemical Formula 1.

Meanwhile, when the structural unit represented by Chemical Formula 1 is prepared and more diamine is used than the carboxylic acid dichloride, an amino group may be present at a terminal of the structural unit represented by Chemical Formula 1.

The structural units represented by Chemical Formulae 2 and 3, respectively, are imide structural units, and may be prepared by a general process of first preparing amic acid units which are precursors of the structural units represented by Chemical Formulae 2 and 3, and then imidizing the precursors. For example, the structural units represented by Chemical Formulae 2 and 3 may be prepared by reacting a tetracarboxylic anhydride with a diamine as monomers so as to form amic acid units, and then imidizing the amic acid through a process such as a thermal solution imidization process or chemical imidization.

For example, the amic acid units that are precursors of the structural units represented by Chemical Formulae 2 and 3 may be prepared with a tetracarboxylic anhydride selected from, for example, 2,2-bis-(3,4-dicarboxyphenyl)hexafluoropropane dianhydride (6FDA), 3,3',4,4'-biphenyltetracarboxylic dianhydride (BPDA), benzophenonetetracarboxylic dianhydride (BTDA), bis(3,4-dicarboxyphenyl)sulfone dianhydride, and a combination thereof; and a diamine selected from, for example, 2,2'-bis(trifluoromethyl)benzidine (TFDB), 4,4'-diaminodiphenyl sulfone (DADPS), 4,4'-(9-fluorenylidene)dianiline (BAPF), bis(4-(4-aminophenoxy)phenyl)sulfone (BAPS), 2,2',5,5'-tetrachlorobenzidine, 2,7-diaminofluorene, 1,1-bis(4-aminophenyl)cyclohexane, 4,4'-methylenebis-(2- methylcyclohexylamine), 4,4-diaminooctafluorobiphenyl, 3,3'-dihydroxybenzidine, 1,3-cyclohexanediamine, and a combination thereof.

Herein, the type and amount of the tetracarboxylic anhydride and the diamine may be appropriately selected according to a desired composition of the structural units represented by Chemical Formula 2 or 3.

When the precursor of the structural unit represented by Chemical Formulae 2 and 3 are prepared and more of the diamine is used than the tetracarboxylic anhydride, an amino group may be present at a terminal end of the precursor of the structural units represented by Chemical Formulae 2 and 3.

In an exemplary embodiment, the poly(imide-amide) copolymer according to an embodiment may be prepared by first preparing polyamic acid as described above, and then adding monomers for preparing polyamide so that the monomers react with the polyamic acid to prepare the poly(imide-amide) copolymer. If the polyamide is first prepared, viscosity increases rapidly, which may cause uneven reaction with the monomers later added for preparing polyamic acid. Further, polyamide is less soluble than polyamic acid, which may cause turbulence of the solution, and the polyamide may be separated from the solvent. Accordingly, it may be advantageous to first polymerize polyamic acid.

While only the method for preparing polyamide including the structural unit represented by Chemical Formula 1 is described, polyamide further including the structural unit represented by Chemical Formula 5 or Chemical Formula 6 may also be prepared in the same way as described above except for different component or monomer.

A molecular weight of the copolymer according to an embodiment may be adjusted appropriately according to its use, and thus an oligomer or high molecular weight polymer may be obtained.

According to another embodiment, an article including the poly(imide-amide) copolymer is provided. The article may be a film, a fiber, a coating material, or an adhesive.

The article may be formed using the poly(imide-amide) copolymer through a dry-wet method, a dry method, or a wet method, but this disclosure is not limited thereto.

According to an exemplary embodiment when the article is a film, the film may be manufactured using the copolymer through the dry-wet method, where a layer is formed by extruding a solution dissolving the poly(imide-amide) copolymer from a mouth piece on a supporter, such as drum or an endless belt, drying the layer, and evaporating the solvent out of the layer until the layer has self-maintenance properties. The drying may be performed at about 25° C. to about 300° C. for about 1 hour or less. When the surface of the drum and/or the endless belt used for the drying process becomes flat, a layer with a flat surface is formed. The layer obtained after the drying process is delaminated from the supporter, and used in a wet process, desalted and/or desolventized. The manufacturing of the film is completed as the layer is elongated, dried, and/or heat treated.

The elongating conforms to a draw ratio, which may range from about 0.8 to about 8 in terms of surface ratio. According to an embodiment, it may range from about 1.3 to about 8. As used herein, the term "surface ratio" refers to a value obtained by dividing the area of a layer after the elongating, by an area of the layer before the elongating. A value of 1 or less denotes a relaxed state. According to an exemplary embodiment, the elongating may be performed not only in a surface direction but also in a thickness direction.

The heat treatment may be performed at a temperature of about 200° C. to about 500° C., particularly at about 250° C. to about 400° C., for about a few seconds to about a few minutes.

Also, the layer after elongating and heat treatment may be cooled slowly, particularly at a speed of about 50° C./second or lower.

The layer may be formed as a single layer or as multiple layers.

An article including the poly(amide-imide) copolymer may have a total light transmittance of about 80% or higher, for example, of about 85% or higher, for example, of about 88% or higher, at a wavelength range of about 380 nanometers (nm) to about 750 nm.

When the light transmittance of the article including the poly(imide-amide) copolymer is within this range, the article including the poly(imide-amide) copolymer may have excellent or improved color reproducibility.

The article may be a film having greater than or equal to about 5.5 GPa of tension modulus, and less than or equal to about 3.5 of YI.

When the tension modulus is within the range, the article may have high hardness. When the YI is within the range, the article may be transparent and colorless.

The article may have an increase in yellowness index ($\Delta$YI) of less than or equal to about 0.7, for example, less than or equal to about 0.5, after being exposed to (radiated by) ultraviolet light (UV) for 72 hours.

According to yet another embodiment, provided is a display device including the article.

The display device may be a flexible display device, and the article may be used as a window film of the flexible display device.

Hereafter, the technology of this disclosure is described in detail with reference to examples. The following examples and comparative examples are not restrictive but are illustrative.

EXAMPLES

Example 1: Synthesis of Poly(Imide-Amide) Copolymer 170 grams of N,N-dimethyl acetamide ("DMAC") is placed in a 250 ml flask, which is equipped with agitator, dropping funnel, temperature adjustor, $N_2$-inputting apparatus, and cooler, while flowing $N_2$ gas. Then, 14.70 grams of 2,2'-bis(trifluoromethyl)benzidine ("TFDB") is added thereto and the reaction mixture is stirred until the solid is dissolved, while maintaining the temperature at 25° C. To the flask, 3.49 grams of pyridine is added to neutralize hydrochloric acid (HCl) that is produced from the later reaction between TFDB and BPCl. To the reactor, 5.13 grams of BPCl is slowly added to carry out the reaction. Then, 6.12 grams of 2,2-bis(3,4-dicarboxyphenyl)hexafluoropropane dianhydride ("6FDA") and 4.05 grams of 3,3',4,4'-biphenyl tetracarboxylic dianhydride ("BPDA") are added and the reaction mixture is agitated until the solid is dissolved. The temperature is maintained at 25° C. during the reaction. Upon completion of the polymerization reaction, poly(amic acid-amide) copolymer solution having solid content of about 15 weight % is obtained.

6.54 grams of pyridine and 8.44 grams of acetic anhydride are added to the obtained poly(amic acid-amide) copolymer solution and dissolved by agitation for 30 minutes to prepare poly(imide-amide) copolymer solution.

The obtained poly(imide-amide) copolymer solution is added to a mixture of water and ethanol in a volume ratio of 1:2, followed by grinding. The grinded suspension is filtered and the filtered powder is obtained by drying in a vacuum at about 120° C. to obtain poly(imide-amide) copolymer powder.

Examples 2 to 7 and Comparative Examples 1 to 8: Syntheses of Poly(Imide-Amide) Copolymers Poly(imide-amide) copolymers according to Examples 2 to 7 and Comparative Examples 1 to 8 are prepared by the same method as in Example 1, except that BPCl, BPDA, 6FDA, and TFDB are used in amounts as described in Table 1 below.

Preparation Example and Experimental Example: Fabrication of Poly(Imide-Amide) Copolymer Films and Evaluation of Properties of the Films 10 grams of each poly(imide-amide) copolymer powder prepared in Examples 1 to 7 and Comparative Examples 1 to 8 are dissolved in 90 grams of N,N-dimethyl acetamide ("DMAC") to produce a 10 percent by weight (weight %) solution. The obtained solutions are each coated on a stainless steel substrate and casted to a thickness of 390 micrometers (μm). Then, the coated substrates are dried with hot stream of air heated to 130° C. for 30 minutes, and the films are delaminated from the substrates to be fixed in frames with pins. The film fixed frames are put in an oven and slowly heated from 30° C. to 300° C. for 1.5 hours. After that, the films are slowly cooled and delaminated from the frames to obtain poly(imide-amide) films having a thickness of 50 μm.

The yellowness index ("YI"), the yellowness index change ("ΔYI"), haze, and tension modulus of the obtained films are measured and summarized in Table 1 below.

YI is measured by using KONICA MINOLTA Spectrophotometer (Model Name: CM-3600D) according to ASTM D 1925.

ΔYI is measured by the color change of the films before and after exposure to the UV light of UB-B lamp for 72 hours. That is, ΔYI is obtained by calculating according to Equation 1 below.

$$\Delta YI = YI_{after\ 72\ hours\ exposure\ to\ UV} - YI_{before\ 72\ hours\ exposure\ to\ UV}$$ Equation 1

Haze is measured by AST E313.

The tension modulus is determined by using Universal Tensile Machine of Instron Co., Ltd., according to ASTM D 882.

TABLE 1

| | Composition | | | | Properties | | | |
|---|---|---|---|---|---|---|---|---|
| | BPCl | BPDA | 6FDA | TFDB | YI [—] | ΔYI [—] | Haze [%] | Modulus [GPa] |
| | | [mol %] | | | | | | |
| Example 1 | 40 | 30 | 30 | 100 | 2.6 | 0.7 | 0.2 | 6.1 |
| Example 2 | 28 | 50 | 22 | 100 | 3.2 | 0.3 | 0.9 | 6.3 |
| Example 3 | 19 | 50 | 31 | 100 | 2.6 | 0.2 | 0.8 | 5.6 |
| Example 4 | 20 | 50 | 30 | 100 | 2.6 | 0.3 | 0.7 | 5.8 |
| Example 5 | 26 | 36 | 37 | 100 | 2.4 | 0.5 | 0.5 | 5.6 |
| Example 6 | 10 | 60 | 30 | 100 | 2.6 | 0.1 | 0.4 | 5.7 |
| Example 7 | 15 | 70 | 15 | 100 | 2.9 | 0.1 | 0.6 | 6.3 |
| Comparative Example 1 | 10 | 0 | 90 | 100 | 1.6 | 0.9 | 1.1 | 3.9 |
| Comparative Example 2 | 20 | 0 | 80 | 100 | 1.7 | 0.6 | 0.6 | 4.1 |
| Comparative Example 3 | 30 | 0 | 70 | 100 | 1.7 | 0.8 | 1.0 | 4.2 |
| Comparative Example 4 | 10 | 10 | 80 | 100 | 1.5 | 0.8 | 0.2 | 3.8 |
| Comparative Example 5 | 30 | 10 | 60 | 100 | 1.8 | 0.6 | 0.3 | 4.5 |
| Comparative Example 6 | 50 | 10 | 40 | 100 | 2.4 | 0.2 | 0.3 | 5.2 |
| Comparative Example 7 | 10 | 30 | 60 | 100 | 1.9 | 0.3 | 0.5 | 4.4 |
| Comparative Example 8 | 30 | 30 | 40 | 100 | 2.3 | 0.4 | 0.6 | 5.2 |

As shown from Table 1, the tension moduli of the films according to the examples increase, as well as YI values maintaining in a certain range, by including BPDA and BPCL, both having rigid structures, in at least certain amounts. However, if the total amount of BPDA and BPCl exceeds a predetermined range, the tension modulus, as well as YI, increases.

A person skilled in the art to which the invention pertains will understand that the films may have high hardness, while maintaining YI in a certain range, by adjusting the contents of the poly(imide-amide) copolymer according to its use.

Further, as the film prepared from the poly(imide-amide) copolymer still maintain flexibility of the film itself, it may be used as a window film of a flexible display device requiring high hardness, high transparency, and ability to bend.

While this disclosure has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A window film for a display device having a tensile modulus of greater than or equal to 5.5 giga Pascals, and a yellowness index of less than 3.5, wherein the window film comprising a poly(amide-imide) copolymer consisting of
a structural unit represented by Chemical Formula 1;
a structural unit represented by Chemical Formula 2 and/or an amic acid precursor structural unit which forms the structural unit represented by Chemical Formula 2 through imidization; and
a structural unit represented by Chemical Formula 3 and/or an amic acid precursor structural unit which forms the structural unit represented by Chemical Formula 3 through imidization:

Chemical Formula 1

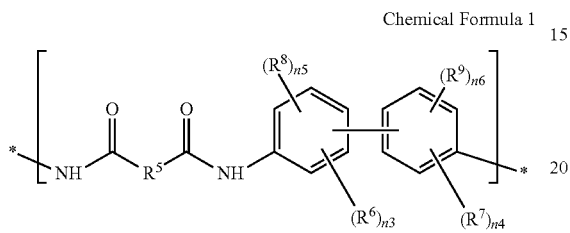

wherein in Chemical Formula 1,
$R^5$ is the same or different in each structural unit, and is each independently a substituted or unsubstituted C10 to C30 aromatic organic group, wherein the C10 to C30 aromatic organic group comprises two or more aromatic rings, wherein the two or more aromatic rings are fused together to provide a condensed ring system, or wherein the two or more aromatic rings are connected through a single bond or through a functional group selected from a fluorenylene group, O, S, C(=O), CH(OH), S(=O)$_2$, and a combination thereof, wherein the substituted C10 to C30 aromatic organic group is substituted with a halogen, a hydroxyl group, a nitro group, a cyano group, NH$_2$, a carboxyl group, a C1 to C10 aliphatic organic group, or a C6 to C20 aromatic organic group,
$R^6$ and $R^7$ are the same or different and are each independently an electron withdrawing group selected from —CF$_3$, —CCl$_3$, —CBr$_3$, —Cl$_3$, —F, —Cl, —Br, —I, —NO$_2$, —ON, —COCH$_3$, and —CO$_2$C$_2$H$_5$;
$R^8$ and $R^9$ are the same or different, and are each independently a hydroxy group, a C1 to C10 aliphatic organic group, a C6 to C20 aromatic organic group, an alkoxy group of formula —OR$^{204}$ (wherein R$^{204}$ is a C1 to C10 aliphatic organic group), or a silyl group of formula —SiR$^{205}$R$^{206}$R$^{207}$ (wherein R$^{205}$, R$^{206}$, and R$^{207}$ are the same or different and are each independently hydrogen or a C1 to C10 aliphatic organic group),
n3 is an integer ranging from 1 to 4, n5 is 0,
n4 is an integer ranging from 1 to 4, n6 is 0, Chemical Formula 2

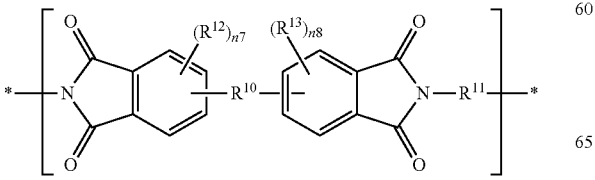

Chemical Formula 3

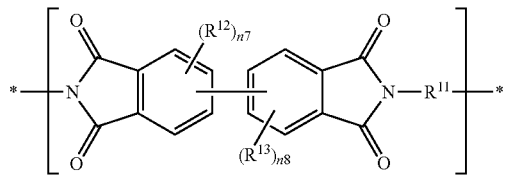

wherein in Chemical Formula 2 or 3,
$R^{10}$ is the same or different in each structural unit, and is each independently a substituted or unsubstituted C1 to C30 aliphatic organic group, a C3 to C30 alicyclic organic group, a C6 to C30 aromatic organic group, or a C2 to C30 heterocyclic group, wherein the substituted C1 to C30 aliphatic organic group is substituted with a halogen, a hydroxyl group, a nitro group, a cyano group, NH$_2$, a carboxyl group,
$R^{11}$ is the same or different in each structural unit, and each independently comprises a substituted or unsubstituted C6 to C30 aromatic organic group, wherein the C6 to C30 aromatic organic group is a single aromatic ring, two or more aromatic rings fused together to provide a condensed ring system, or two or more moieties independently selected from the single aromatic ring and two or more aromatic rings fused together to provide a condensed ring system, which are connected through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, and a combination thereof, wherein the substituted C6 to C30 aromatic organic group is substituted with a halogen, a hydroxyl group, a nitro group, a cyano group, NH$_2$, a carboxyl group, or —CF$_3$;
$R^{12}$ and $R^{13}$ are the same or different, and are each independently a halogen, a hydroxy group, a C1 to C10 aliphatic organic group, a C6 to C20 aromatic organic group, an alkoxy group of formula —OR$^{208}$, wherein R$^{208}$ is a C1 to C10 aliphatic organic group, or a silyl group of formula —SiR$^{209}$R$^{210}$R$^{211}$, wherein R$^{209}$, R$^{210}$, and R$^{211}$ are the same or different, and are each independently hydrogen or a C1 to C10 aliphatic organic group, and
n7 and n8 are each independently integers ranging from 0 to 3,
wherein the poly(imide-amide) copolymer comprises about 5 mole percent to about 50 mole percent of the structural unit represented by Chemical Formula 1, about 20 mole percent to about 80 mole percent of the structural unit represented by Chemical Formula 3 and/or the amic acid structural unit which forms the structural unit represented by Chemical Formula 3 through imidization, and the remaining amount of the structural unit represented by Chemical Formula 2 and/or the amic acid structural unit which forms the structural unit represented by Chemical Formula 2 through imidization based on the total mole number of the total structural units in the poly(imide-amide) copolymer, provided that the total amount of the structural unit represented by Chemical Formula 1, and the structural unit represented by Chemical Formula 3 and/or the amic acid structural unit which forms the structural unit represented by Chemical Formula 3 through imidization is greater than or equal to 62 mole percent and less than or equal to 85 mole percent based on the total mole number of the total structural units in the poly (imide-amide) copolymer.

2. The window film according to claim 1, wherein $R^5$ is selected from chemical formulae:

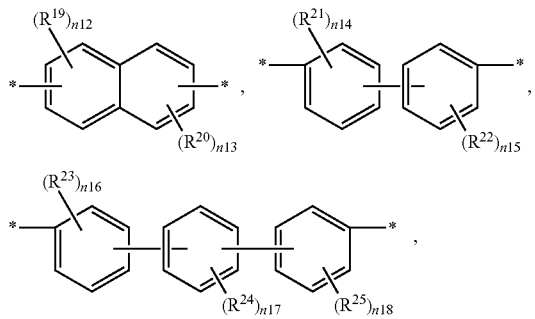

wherein in the chemical formulae, $R^{19}$ to $R^{25}$ are the same or different, and are each independently deuterium, a halogen, a C1 to C10 aliphatic organic group, or a C6 to C20 aromatic organic group, n12 and n13 are independently integers ranging from 0 to 3, and n14 to n18 are independently integers ranging from 0 to 4.

3. The window film according to claim 1, wherein $R^5$ is selected from chemical formulae:

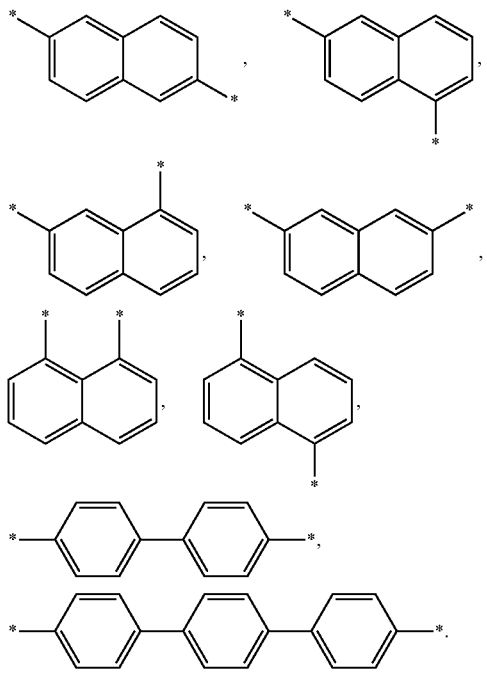

4. The window film according to claim 1, wherein Chemical Formula 2 is represented by Chemical Formula 4:

Chemical Formula 4

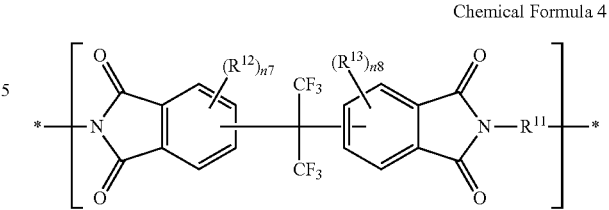

wherein in Chemical Formula 4,
$R^{11}$, $R^{12}$, $R^{13}$, n7, and n8 are the same as in Chemical Formula 2.

5. The window film according to claim 1, wherein the amount of the structural unit represented by Chemical Formula 3 and/or the amic acid structural unit which forms the structural unit represented by Chemical Formula 3 through imidization is from about 30 mol % to about 70 mol % based on the total mole number of the total structural units in the copolymer.

6. The window film according to claim 1, wherein the structural unit represented by Chemical Formula 1 is represented by Chemical Formula 7, the structural unit represented by Chemical Formula 2 is represented by Chemical Formula 8, and the structural unit represented by Chemical Formula 3 is represented by Chemical Formula 9:

Chemical Formula 7

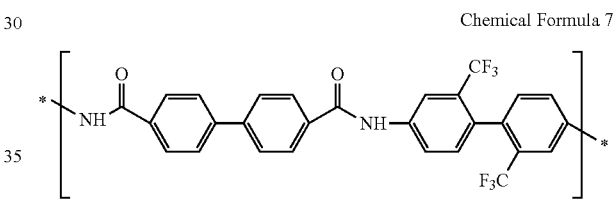

Chemical Formula 8

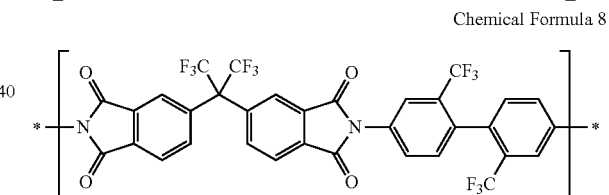

Chemical Formula 9

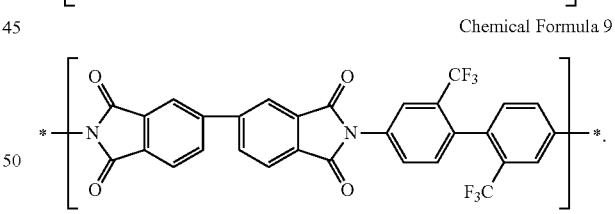

7. The window film according to claim 6,
wherein the poly(imide-amide) copolymer comprises about 5 mole percent to about 50 mole percent of the structural unit represented by Chemical Formula 7, about 20 mole percent to about 80 mole percent of the structural unit represented by Chemical Formula 9 and/or the amic acid structural unit which forms the structural unit represented by Chemical Formula 9 through imidization, and the remaining amount of the structural unit represented by Chemical Formula 8 and/or the amic acid structural unit which forms the structural unit represented by Chemical Formula 8 through imidization based on the total mole number of the structural units in the poly(imide-amide) copolymer, provided that the total amount of the structural unit represented by Chemical Formula 7, and the structural unit represented by Chemical Formula 9 and/or the amic acid structural unit which forms the structural unit represented by Chemical Formula 9 through imidization is greater than or equal to 62 mole percent and less than or equal to 85 mole percent based on the total mole number of the total structural units in the poly(imide-amide) copolymer.

8. The window film according to claim 1, wherein the film has an increase in yellowness index of less than or equal to 0.7 after being exposed to ultraviolet light for 72 hours.

9. The window film according to claim 1, wherein the film has an increase in yellowness index of less than or equal to 0.5 after being exposed to ultraviolet light for 72 hours.

10. A display device comprising the window film according to claim 1.

* * * * *